Figures 1, 2:
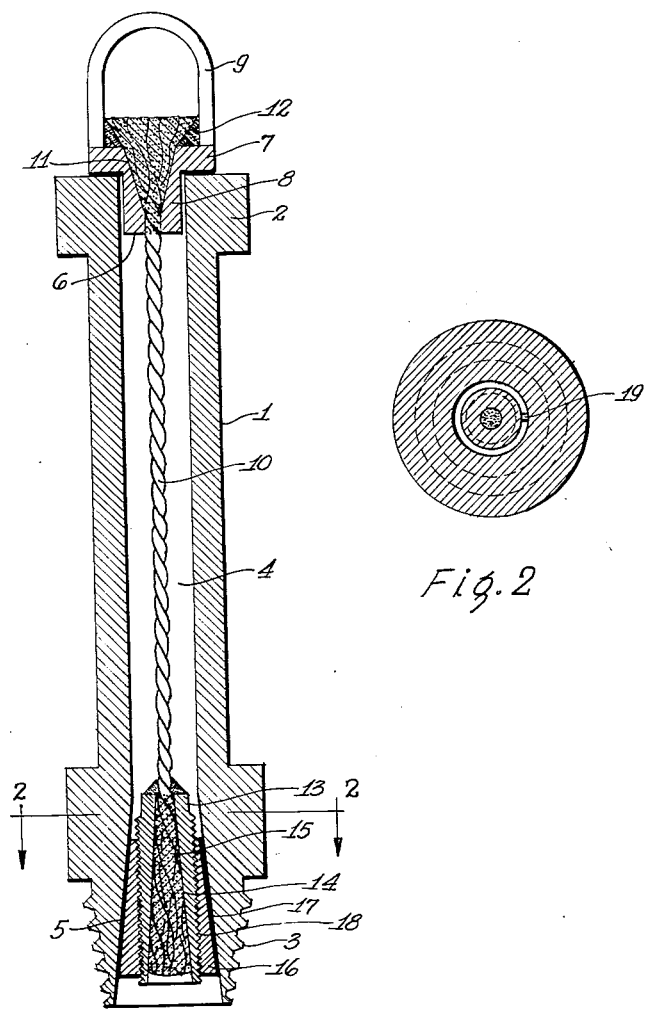

Jan. 2, 1962 W. E. OAKES 3,015,512
DRILL COLLAR HANDLING SUB
Filed Aug. 11, 1960

INVENTOR
William E. Oakes.
BY Alex. E. MacRae
ATTORNEY

United States Patent Office 3,015,512
Patented Jan. 2, 1962

3,015,512
DRILL COLLAR HANDLING SUB
William E. Oakes, 11415 67th St., Edmonton,
Alberta, Canada
Filed Aug. 11, 1960, Ser. No. 48,979
1 Claim. (Cl. 294—1)

This invention relates to a drill collar handling sub as employed in oilfield drilling operations for the purpose of lifting and handling of drill collars.

Drill collars are employed to give weight to the drill bit in oilfield drilling equipment, as well as to stabilize the drill string while drilling. They are made in various sizes, and used in a combination of sizes. For instance, in drilling a 12¼ inch diameter hole, as many as three 11 inch outside diameter, three 9 inch outside diameter, and twelve to fifteen 7 inch outside diameter collars will be used.

Drill collar lifting subs are used extensively to assemble the drill collars and raise and lower them out of and into the hole. The great weight of the drill collar string (40 to 50 tons) is borne by the cap of the lifting sub. If the cap should receive a jar or shock, the cap and stem can, and sometimes does, break apart from overloading or metal fatigue. This results in the drill collars falling into the hole with resultant interruption of operations as well as possible injury to the drilling personnel from falling metal.

It is an object of this invention to provide a drill collar lifting sub which is of simple and convenient manufacture, which has much greater resistance to failure in use while having reduced weight, and which possesses means preventing the separation of parts therefrom as a result of breaking of the stem thereof to avoid falling of such parts.

The invention will be described with reference to the accompanying drawing in which:

FIGURE 1 is a sectional side elevation of a drill collar lifting sub in accordance with the invention, and FIGURE 2 is a section on line 2—2 of FIGURE 1.

Referring to the drawing, the sub shown comprises a stem 1 having a cap 2 at one end and an externally threaded portion 3 at the other end for application thereto of a drill collar.

The stem has an axial bore 4 the end section 5 of which within threaded portion 3 being of conical or tapered form. Thus, section 5 is of gradually decreasing diameter from the adjacent end of the bore.

A socket member 6 has an annular shoulder 7 seated on the end of cap 2 and a cylindrical portion 8 extending into the bore 4. An eye 9 is fixed to member 6 to provide means for lifting and handling of the sub.

A wire or cable line 10 has one end anchored in socket member 6. This may be effected by providing a conical socket 11 in member 6, partially separating the strands of the wire line within socket 11 and embedding the wire strands in a suitable seizing compound 12.

The wire line 10 extends axially through bore 4 and its other end is anchored in an externally threaded socket member 13 as by means of a conical socket 14 in the member and seizing compound 15.

Means for placing the wire line 10 under tension comprises a locknut 16 having an external tapered surface 17 complementary to and in engagement with tapered section 5 and internally threaded at 18 for threaded engagement with socket member 13. Locknut 16 is split at 19 whereby it may expand as a result of rotation thereof and axial movement inwardly of the socket member 13 to place the line 10 under tension. It will be apparent that, since the nut is split lengthwise on one side only, it will tighten against the tapered bore section and lock on the thread of the socket member.

While dimensions may vary, preferably the wire line 10 is at least 1¼" diameter with a breaking strength of at least 14,000 lbs.

The prestressing of the wire line gives a compression effect to the stem of the sub which permits the wire line to take the load along with the stem and reduces the effect of shock loading on the stem. For instance, the line within the stem of a sub used for larger drill collars may have approximately 90,000 lbs. breaking strength. This would be prestressed to approximately 50,000 lbs. at which it is locked by nut 16.

It will be apparent that the drill collar lifting sub described will possess much greater strength while being of less weight than a conventional sub of solid stem. If the stem should break during use, the parts thereof will not separate due to the presence of the wire line thereby avoiding possible injury by falling metal to personnel on the drilling floor as well as the need for fishing for drill collars in the hole.

The sub described will also possess a longer useful life because of less fatigue imposed thereon.

The provision of an eye on the line socket member 11 results in greater handling ease with increased safety.

Moreover, use of the sub described prevents gas blowing out through a sub while drill collars are being lifted out of the hole.

I claim:

A drill collar handling sub comprising a rigid metal stem having a cap at one end and an externally threaded portion at the other end thereof, said stem having an axial bore extending therethrough, a wire line extending axially through said bore, and means for prestressing said wire line and for maintaining said wire line under tension comprising a socket member seated on said stem at each end thereof, said wire line having each of its ends embedded in and fixed to one of said socket members, one of said socket members having a shoulder seated on the end of said stem adjacent said cap, and a handling eye fixed to said shoulder, the other of said socket members being of substantially cylindrical externally threaded form, said bore having a tapered section lying within said threaded end portion of said stem, said tapered section being of gradually decreasing diameter from the adjacent end of said stem, and an expansible locknut having threaded engagement with said threaded socket member and also having a tapered outer surface complementary to and in engagement with said tapered section.

References Cited in the file of this patent

UNITED STATES PATENTS

| | | |
|---|---|---|
| 1,342,855 | McCausland | June 8, 1920 |
| 1,544,041 | Schirnhofer | June 30, 1925 |
| 1,544,659 | Lawson | July 7, 1925 |
| 1,845,061 | Schmalz | Feb. 16, 1932 |
| 1,939,968 | Frei | Dec. 19, 1933 |
| 2,043,357 | Strauss | June 9, 1937 |
| 2,473,417 | Essl | June 14, 1949 |
| 2,571,145 | Lord | Oct. 15, 1951 |
| 2,803,486 | Larson et al. | Aug. 20, 1957 |